Nov. 10, 1931.  C. L. HEISLER  1,831,562
FILM DRIVING MECHANISM
Filed Feb. 19, 1929
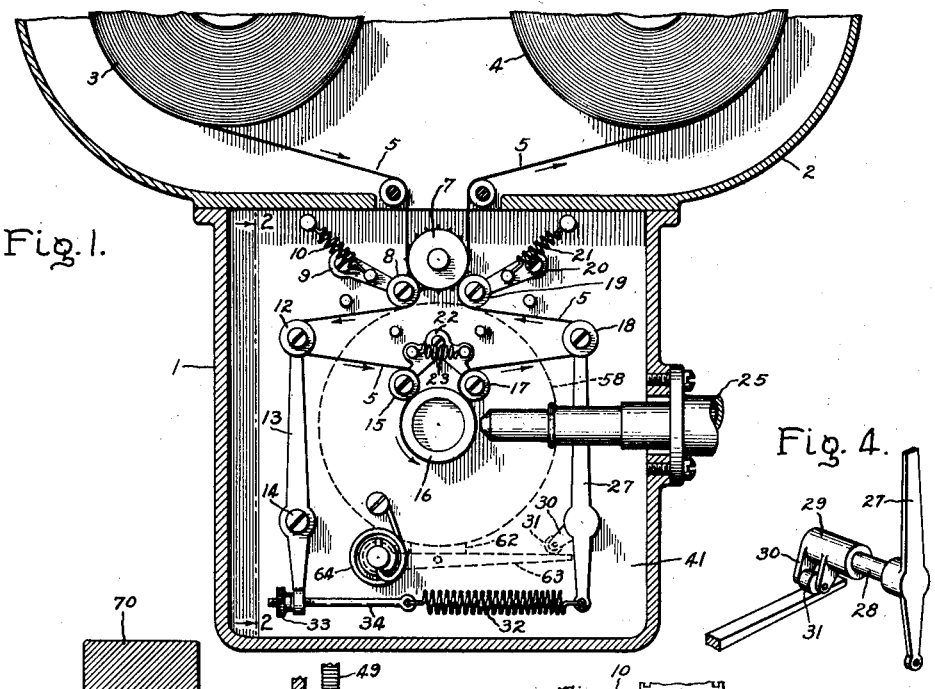
Inventor
Charles L. Heisler,
by Charles E. Tullar
His Attorney.

Patented Nov. 10, 1931

1,831,562

UNITED STATES PATENT OFFICE

CHARLES L. HEISLER, OF SCHENECTADY, NEW YORK, ASSIGNOR TO GENERAL ELECTRIC COMPANY, A CORPORATION OF NEW YORK

FILM DRIVING MECHANISM

Application filed February 19, 1929. Serial No. 341,147.

My invention relates to apparatus for recording sound on a film of the motion picture type and to apparatus for reproducing sound from a film record. It relates particularly to the film driving mechanism forming a part of such apparatus and including a drum and a sprocket both engaging the film and an inertia device associated with the drum. The object of my invention is the provision of improved mechanism of this character which is efficient and compact in construction and with which the movement of the film is uniform and free of vibrations due to slippage on the surface of the drum or to excessive wear of the mechanism incident to rapid starting thereof.

My invention will be better understood from the following description taken in connection with the accompanying drawings, and its scope will be pointed out in the appended claims.

For the purpose of illustration I have chosen to show my invention as comprising a part of an apparatus for recording sound on a film but it will be understood that my invention is not limited to recording apparatus but is equally applicable to apparatus for reproducing sound from a film record or to any other apparatus whose function is to support and move a film in a similar manner.

I have, accordingly, shown in Fig. 1 of the drawings a cross section through a sound recorder involving my invention; Fig. 2 shows a section of the apparatus at right angles to that of Fig. 1; Figs. 3 and 4 show details of the apparatus and Fig. 5 illustrates a modification.

The frame of the apparatus is in the form of a light excluding enclosing casing 1 upon which rests the film magazine 2 shown containing the two rolls 3 and 4 of film 5. The rolls are supported on suitable reels, not shown, the unwinding reel and the winding reel being provided respectively with suitable braking and take-up means well known in the motion picture art.

The film 5 which is provided with sprocket tooth openings is shown engaging one side of the sprocket 7 upon entering the casing 1 and upon leaving the casing engaging the opposite side. If desired, however, two separate sprockets may be employed suitably connected to move both portions of the film at the same speed. From the sprocket 7 the film passes over the pressure roll 8 mounted on the end of lever 9 to which is attached the spring 10 for holding the roll against the film on the sprocket with the desired pressure. From the pressure roll 8 the film passes in a loop over the idler 12 mounted on one end of the lever 13 which is pivoted at 14. From the loop held taut by the idler 12 the film passes over pressure roll 15, around the smooth driving roller or drum 16 and thence over pressure roll 17 similar to roll 15, to a second loop held taut by idler 18, over pressure roll 19, over sprocket 7 and back to film roll 4. The pressure rolls 17 and 19 and the idler 18 are similar in all respects to the aforementioned corresponding members 15, 8 and 12. Pressure roll 19 also is mounted on lever 20 held in position by spring 21 in the same manner as roll 8. Pressure rolls 15 and 17 are mounted on the ends of levers 22 which are shown actuated by a common spring 23.

By means subsequently to be described the drum 16 is driven at such a speed that it moves the film thereon at the same linear velocity at which it is moved by the sprocket 7 regardless of how much shrinkage or elongation the film may have undergone. At 25 I have shown a portion of the optical system by which I direct upon the film, while supported on the face of the drum, a narrow transverse light beam which is varied in accordance with the sound waves being recorded. This optical system includes an illuminated light slit of which a reduced image is formed on the film by means of suitable lenses as disclosed, for example, by the Eldred Patent 1,655,811, January 10, 1928. Various means may be employed for varying the light beam focussed upon the film. The entire slit may be illuminated by a light source which varies in intensity in accordance with the sound waves as in the above mentioned Eldred patent whereby a sound record of the variable intensity type is obtained, or a constant intensity light source may be used and a light beam therefrom caused to vibrate longitudinally of the slit in accordance with the sound waves thereby producing a sound record of the variable width type.

My invention as disclosed in this application, however, is not limited to any particular optical system or means for directing a narrow sound controlled light beam on the film.

One of the essential requirements for the making of a true sound record on a film is that the film at the point of exposure shall move at a uniform speed and free of any jerks or vibrations of any kind such, for example, as commonly arise from slippage of the film on the surface of the driving member thereof or from improper sprocket tooth action. In the apparatus disclosed herein uniformity of the speed of the drum 16 is promoted by a relatively large fly wheel hereinafter described and directly mounted on the drum shaft. Any sprocket tooth vibrations which may arise from the engagement of the film and the sprocket 7 are damped out in passing the loops engaged by the yielding idlers 12 and 18. I have found that with an apparatus such as I have described a slipping of the film on the face of the drum will occur unless the tension of the film as it approaches the drum is the same as the tension as it leaves the drum. This slippage although it may be slight is sufficient to produce a noticeable effect when the sound is reproduced. To insure a substantially equal tension in the film as it approaches and leaves the drum I have provided a single tensioning member for the two idlers 12 and 18. I mount idler 18 on the end of the lever 27 which in general is similar to lever 13 except that it is secured to the short shaft 28 which is journalled in a wall of the casing and to which is secured the sleeve 29 having arms 30 carrying the roller 31. The lower ends of the two levers 13 and 27 are connected together by the common coil spring 32, the tension of which may be adjusted by turning the nut 33 on the rod 34. Inasmuch as the corresponding lever arms of the two levers are substantially equal in length and the two levers are connected to opposite ends of a common spring, the tension of the film as it approaches and leaves the drum is substantially the same, the slight friction of the idlers and pressure rolls being negligible. As a result of this construction, therefore, no slipping or creeping of the film on the drum occurs.

In my copending application, Serial No. 212,349, filed August 11, 1927 I have disclosed and claimed a film driving apparatus comprising a sprocket and a drum both driven by connection with the same motor, the sprocket connection being positive while the drum connection is variable through a compensating device which is governed by a loop in the film between the sprocket and the drum. The driving apparatus disclosed in this my present application in certain respects is similar to that disclosed in my aforesaid application in that it includes a sprocket and a drum with a compensating device for regulating the speed of the drum controlled by a loop in the film. The compensator forming a part of my present invention is, however, an improved form of the compensator disclosed in my Patent 1,771,922, July 29, 1930, where the drum is the element which is positively connected with the motor and the sprocket is the element which is driven through the compensator.

My improved compensator has a more compact construction, has few parts and is capable of being manufactured at a lower cost. Drum 16 is mounted on the end of the shaft 40 which is journalled in the casing walls 41. Keyed to shaft 40 is the sleeve 42 having at one end the internal gear 43. Journalled on sleeve 42 is the sleeve 44 on one end of which is the gear 45 which through the idler gear 46 and gear 47 drives shaft 48 carrying sprocket 7. Gear 47 also meshes with another gear 49 which forms a part of the driving connection, not shown, to the film winding reel. Intermediate the ends of sleeve 44 is the worm wheel 50 meshing with the driving worm 51. The shaft 52 of this worm is operated by a suitable driving motor, as for example a synchronous motor, to the rotor of which I prefer to directly connect the shaft. Both worm and worm gear are very carefully and accurately constructed to insure perfect meshing of the teeth thereof so as to avoid transmitting to the drum any tooth vibrations which might otherwise arise at this point. Annular member 53 is rotatably supported jointly by 43 and 44 and is yieldingly connected to the worm gear 50 by the ring 54, for example of leather, and pins 55 engaging in holes therein and secured respectively to the gear and the annular member. Secured to the annular member is the internal ring gear 56, the pitch diameter of which is a little larger than the pitch diameter of the internal gear 43. Journalled on the drum shaft 40 is the brake wheel 58 having its hub portion 59 eccentric to the brake wheel and shaft, which eccentric portion forms a bearing for the gear member 60. This member has two sets of gear teeth which have different pitch diameters and which mesh respectively with the internal gears 43 and 56. Brake wheel 58 is engaged by the brake 62 on brake arm 63 which is pivotally mounted in the casing and normally held in applied position by the coil spring 64. Brake arm 63 is engaged at its end by the roller 31 moved by lever 27.

If the brake 62 is held away from the brake wheel 58 so that the latter may rotate freely, the several members mounted upon the drum shaft 40 rotate together as a unit. In this case the sprocket 7 because of the gearing chosen to connect it with the drive worm 51 moves the film at a linear velocity which is a little slower than it is being moved by the drum. The obvious result is that the film loop containing idler 12 will decrease in size and the loop containing idler 18 will increase in size. Consequently lever 27 will rotate clockwise to allow the brake 62 slowly to be applied to the brake wheel. Any decrease in the speed of the brake wheel will by reason of the gearing shown cause a decrease in the speed of the drum as will be readily apparent from an inspection of the drawing. The construction of the compensator is such that when the brake 62 is fully applied, the drum moves the film slower than the sprocket. In the normal operation of the apparatus the brake is but lightly applied so that the film is moved by the drum and the sprocket at the same linear speed which is independent of shrinkage or elongation of the film. It will be understood that as one film loop increases and decreases in size the other loop simultaneously decreases and increases respectively, the two levers 13 and 27 making corresponding movements. Since the brake is never but lightly applied requiring only a weak brake spring 64 and since I have provided a relatively great lever advantage between the idler 18 and the brake spring, the effect of the brake operating means shown on the tension in corresponding film loops is immaterial, in fact I have found by actual test that when the lever 27 is moved by the finger one cannot tell when the roller 31 engages the arm 63 and releases the brake. If conditions are such that I desire still greater refinement in the equalization of the film tension in the two loops I may compensate the effect of the brake spring on the lever 27 by a suitable change in the length of one of the lever arms, for example, by shortening that arm of lever 27 which connects with the common spring 32.

In an apparatus of the character described in this application where for the best results the film should be moved past the point of control with an absolutely uniform speed it is a great advantage to employ a fly wheel preferably directly connected with the film moving member. Such a fly wheel I have shown at 70 mounted on the drum shaft 40. I have already stated in the description above that the entire mechanism is operated from worm shaft 52 which preferably is directly connected with the rotor of an electric motor. Since a small sized motor is sufficient for this purpose it may be thrown on the circuit without the use of starting devices. The motor, particularly if it is a synchronous motor, will develop a large starting torque which were it not for the inertia of the fly wheel would quickly bring the mechanism up to full speed. Should the fly wheel be fixed to the drum shaft the load imposed at starting on the driving motor may seriously affect the motor as well as the circuit to which it is connected. Another serious result is that the teeth in the worm and worm gear become worn or mutilated because of the excessive burden suddenly imposed upon them for it has already been pointed out above that for a high degree of perfection in recording sound it is vital that this worm drive be constructed with the highest degree of precision. The excessive load thrown upon this gear drive by the fly wheel at starting is likely to be disastrous in its effect on the smooth running of the gearing.

To relieve the gearing of the excessive load at starting I provide a slip connection between the fly wheel and the drum shaft which while allowing the shaft immediately to come up to full speed independent of the fly wheel slowly accelerates the fly wheel and when the same has reached the speed of the shaft to become fixed thereto so as to perform its intended function of smoothing out any speed variations of the drum. The fly wheel 70 is journalled on the flanged sleeve 71 which is keyed to the drum shaft 40. To the flange 72 are secured three dowel pins 73 on which is slidingly mounted the friction ring 74. The inner face of this ring is beveled to engage a beveled hub portion on the fly wheel and by means of three springs 75 on adjusting screws 76 carried by the flange 72 the ring is adjustably and yieldingly pressed against the fly wheel. Surrounding and adapted to engage the exterior of the ring are two semi-circular clamps 78 each pivoted at one end to the fly wheel. Two weighted levers 79 pivoted to the fly wheel at 80 engage the free ends of the clamps through the adjusting screws 81. Springs 82 oppose the centrifugal force of the levers. When the apparatus is started the friction ring allows the drum shaft to quickly attain full speed and gradually accelerates the fly wheel. At about the time the fly wheel reaches the speed of the drum shaft the weighted levers 79 fly outward and cause the clamps 78 to grip firmly the friction ring, thereby positively connecting together the fly wheel and drum shaft. By this construction the motor and worm gearing are relieved of the inertia effect of the fly wheel at starting yet the fly wheel during normal operation is positively connected to the drum.

In the modified arrangement shown in Fig. 5 idler lever 13 is the same as in Fig. 1 but the opposed idler lever comprises two separate levers 84 and 85 having a common pivotal point 86. Lever 85 has one arm to which spring 32 is attached and another arm carrying the brake 62. This arm also supports the rod 87 having spring 88 thereon compressed between a nut and washer thereon and the other lever 84 which carries the idler 18. Since the operation of this modified form is believed to be obvious in view of the explanation already given of the form shown in Fig. 1 a detailed explanation thereof will not be made.

What I claim as new and desire to secure by Letters Patent of the United States, is:

1. Film driving apparatus comprising a drum arranged to engage a film and adapted to be driven at a substantially uniform speed, means for moving the film toward and away from said drum, and means engaging the film at points between said drum and said first means for producing substantially equal tensions in the film as it approaches and leaves the drum.

2. Film driving apparatus comprising a driving drum arranged to engage the film, means for rotating the drum at a substantially uniform speed, and tensioning means arranged to engage those portions of the film approaching and leaving the drum, said tensioning means being constructed to produce substantially equal tensions in those portions of the film engaged thereby.

3. Film driving apparatus comprising a driving drum arranged to engage the film, a motor connected thereto, means for feeding the film toward the drum and for withdrawing it therefrom, and yielding means arranged to engage those portions of the film being fed to and being withdrawn from the roller for producing substantially equal tensions in those portions.

4. Film driving apparatus comprising a drum arranged to engage and drive the film, a motor connected therewith, sprocket means connected with said motor arranged to feed the film toward the drum and to withdraw it therefrom, and a plurality of yieldingly mounted members arranged to engage respectively the portions of the film being fed to and withdrawn from the drum and constructed to produce substantially equal film tensions in said portions.

5. Film driving apparatus comprising a drum about which the film is adapted to be wrapped, a motor connected to rotate the drum, a sprocket wheel having a connection with said motor and arranged to move the film both toward and from the drum, a pair of idlers arranged to engage loops respectively in the film approaching and leaving the drum, and a single resilient member operatively connected with the idlers for causing substantially equal tensions in said film loops.

6. Film driving apparatus comprising a motor driven shaft, a single sprocket having a positive drive connection therewith and arranged to engage the film at a plurality of points, a drum over which the film is arranged to pass having a variable speed connection with said shaft, there being a loop in the film passing from the sprocket to the drum and a loop in the film passing from the drum to the sprocket, a pair of levers each having an idler arranged to engage one of said loops, a single spring connected with said levers for producing substantially equal tensions in said film loops, one of said levers having means for varying said variable speed connection in accordance with the size of the film loop engaged thereby.

7. Film driving apparatus comprising a rotatable member adapted to engage and drive a film with a uniform speed, a fly wheel associated with said member, a motor driven shaft having a high starting torque, gearing between the shaft and the film engaging member, a friction coupling between the fly wheel and the member for relieving the gearing of excessive load at starting and speed responsive means on said fly wheel for making positive its connection with said member.

8. Film driving apparatus comprising a rotatable member adapted to engage and drive a film with a uniform speed, a fly wheel operatively connected with said member, a motor driven shaft having a high starting torque, gearing connecting the shaft and the rotatable member, and connecting means between the fly wheel and the rotatable member comprising a friction device for relieving the gearing and the motor of excessive load during starting and a speed responsive device for finally securing the fly wheel to the member.

9. Film driving apparatus comprising a drum arranged to engage a film, a shaft supporting the drum, a fly wheel mounted on the shaft, a motor driven shaft having a high starting torque, worm gearing connecting said shafts, means comprising a frictional connection between the fly wheel and the drum shaft for relieving said gearing of excessive load when the apparatus is being started and the fly wheel is being accelerated and means comprising a centrifugal device for positively connecting the fly wheel to the drum shaft when the fly wheel reaches a predetermined speed.

10. Film driving apparatus comprising a supporting frame, a shaft journalled therein having a film engaging drum secured thereto, a second shaft journalled in said frame having a film engaging sprocket secured thereto, a drive member, gearing positively connecting the drive member and one of said shafts, variable speed gearing connecting the drive member and the other shaft, said variable speed gearing being mounted on said other shaft and including a brake wheel, a brake therefor, and means including a member engaging a loop in the film between the sprocket and the drum for controlling the application of the brake.

11. Film driving apparatus comprising a casing, a shaft journalled in opposite walls thereof having a film engaging drum secured thereto, a second shaft journalled in said casing having a film engaging sprocket secured thereto, a drive member, gearing positively connecting the drive member and the sprocket shaft, variable speed gearing connecting the drive member and the drum shaft and including a plurality of pairs of meshing internal and external gears and a controlling brake wheel mounted on the drum shaft between the walls of said casing, a roller engaging a loop in the film between the sprocket and the drum and a brake for said brake wheel controlled by the position of said roller.

In witness whereof, I have hereunto set my hand this 18th day of February, 1929.

CHARLES L. HEISLER.